United States Patent
Reuter et al.

(10) Patent No.: US 6,651,441 B2
(45) Date of Patent: Nov. 25, 2003

(54) FLUID FLOW SYSTEM FOR A GAS TURBINE ENGINE

(75) Inventors: Charles Reuter, Granby, CT (US); Gerald P. Dyer, Enfield, CT (US); Todd Haugsjaahabink, Belchertown, MA (US); Satish Shah, Rockford, IL (US)

(73) Assignee: Hamilton Sundstrand, Windsor Locks, CT (US)

( * ) Notice: Subject to any disclaimer, the term of this patent is extended or adjusted under 35 U.S.C. 154(b) by 23 days.

(21) Appl. No.: 10/054,480

(22) Filed: Jan. 22, 2002

(65) Prior Publication Data

US 2003/0136103 A1 Jul. 24, 2003

(51) Int. Cl.$^7$ .................................................. F02C 1/00
(52) U.S. Cl. ........................ 60/772; 60/39.281; 60/784; 417/292
(58) Field of Search ....................... 417/292; 60/39.281, 60/734, 736, 772, 789

(56) References Cited

U.S. PATENT DOCUMENTS

| | | | |
|---|---|---|---|
| 3,899,877 A | * 8/1975 | Flanigan et al. ........... | 60/39.14 |
| 4,151,710 A | 5/1979 | Griffin et al. | |
| 4,354,345 A | 10/1982 | Dreisbach, Jr. et al. | |
| 4,498,525 A | 2/1985 | Smith | |
| 4,618,037 A | 10/1986 | Nishikawa | |
| 4,741,152 A | 5/1988 | Burr et al. | |
| 4,809,499 A | 3/1989 | Dyer | |
| 4,876,880 A | 10/1989 | Dyer | |
| 4,899,535 A | * 2/1990 | Dehan et al. ............... | 60/39.08 |
| 4,910,956 A | * 3/1990 | Legore et al. ............. | 60/39.03 |
| 5,156,332 A | 10/1992 | Dyer | |
| 5,159,808 A | 11/1992 | Kast | |
| 5,313,790 A | 5/1994 | Barr | |
| 5,337,553 A | 8/1994 | Barr | |
| 5,339,636 A | 8/1994 | Donnelly et al. | |
| 5,442,922 A | 8/1995 | Dyer et al. | |
| 5,448,882 A | 9/1995 | Dyer et al. | |
| 5,456,574 A | 10/1995 | Donnelly et al. | |
| 5,495,715 A | 3/1996 | Loxley | |
| 5,702,229 A | 12/1997 | Moss et al. | |
| 5,715,674 A | 2/1998 | Reuter et al. | |
| 5,896,737 A | 4/1999 | Dyer | |
| 6,022,197 A | 2/2000 | Cygnor et al. | |
| 6,059,537 A | 5/2000 | Cygnor | |
| 6,189,313 B1 | * 2/2001 | Cass et al. ................. | 60/39.31 |
| 6,250,894 B1 | 6/2001 | Dyer et al. | |
| 6,251,270 B1 | 6/2001 | Blot-Carretero et al. | |
| 6,321,527 B1 | 11/2001 | Dyer et al. | |
| 6,487,847 B1 | * 12/2002 | Snow et al. ................. | 60/235 |

* cited by examiner

Primary Examiner—Cheryl J. Tyler
Assistant Examiner—John F Belena
(74) Attorney, Agent, or Firm—Carlson, Gaskey & Olds

(57) ABSTRACT

A fluid flow system for a gas turbine engine provides combustion fuel to a main pump and an actuator pump significantly reducing heat generation at low flow demand, while regulating actuator flow temperature at high flow demand. Fuel flow from the actuator pump in excess of the actuators needs is directed through an actuator minimum pressure valve and into a thermal bypass valve (TBV.) Depending upon the temperature of the fuel, the TBV determines the path of the excess actuator pump fluid flow. The TBV divides the fuel flow between being recirculated to the actuator pump inlet and the main pump output flow path to the engine fuel input conduit. The engine actuators are thereby assured of receiving flow which preclude freezing of water entrained in the fuel. When there is minimal concern with the possibility of freezing water entrained in the fuel, the TBV passes a greater percentage of fuel through to join together in the engine fuel input conduit.

18 Claims, 1 Drawing Sheet

FLUID FLOW SYSTEM FOR A GAS TURBINE ENGINE

BACKGROUND OF THE INVENTION

The present invention relates to a system for transferring heat energy within a gas turbine engine, and more particularly to a system which provides an actuator pump to minimize the usage of heat exchangers.

The fluid flow requirements of gas turbine engines are well known to the designers of today's high performance aircraft powerplants. Certain internal structures, such as bearings, are both cooled and lubricated by a circulating flow of oil which is distributed and collected throughout the main engine structure. Another thermal management method includes rejecting heat from the circulating oil loops into the flow of fuel entering the engine combustion chamber. This method uses the fuel flow as a recuperative heat sink which incurs few of the penalties of air cooling, but is limited in effectiveness by the maximum temperature tolerable by the fuel. Further effectiveness of using the flow of fuel, is the limitation necessitated by maintaining the fuel flow above freezing to minimize the possibility of ice formation and subsequent entry into sensitive areas such as engine actuators.

Main fuel pumps for aircraft gas turbines have traditionally been fixed delivery, positive displacement type pumps connected mechanically to the rotating engine shaft. As the flow rate from a pump turning proportional to engine shaft speed cannot match the fuel flow requirements of a gas turbine engine operating under a variety of power levels, it is common to size the main fuel pump with an excess flow capacity under all engine operating conditions. The fuel system therefore include a fuel bypass for routing excess main fuel flow back to the low pressure side of the main pump. Such fluid flow system requirements results in complex thermal management requirements.

Cooling oil circulating through the main engine lubrication system receives heat energy at a rate related to the product of engine rotor speed and power output. The cooling needs of the main engine lubrication loop are thus at a minimum during periods of low power operation, such as idling, and at a maximum during high or full power operation, such as takeoff.

Under certain operating conditions, such as engine idling, the amount of fresh fuel entering the fuel system is small while the relative volume of fuel being bypassed back to the pump inlet is quite large. The combination of pump inefficiency and recirculation of excess fuel through the fuel bypass may heat the circulating fuel to an undesirably high temperature. This excess heat must be rejected to assure that the fuel remains within its maximum tolerable temperature.

Excess heat is commonly managed by a combination of fuel/oil and air/oil heat exchangers. Such heat exchangers are undesirable because of their negative impact on engine efficiency, weight and expense. Thermal energy rejected from the engine oil does not contribute to engine thrust, while the majority of thermal energy rejected from the oil to the fuel is recovered at the engine burner stage. Additionally, cooling air for the air/oil coolers is typically bled from a cool high-pressure air source such as engine fan discharge which further reduces engine thrust.

Conversely, other operating conditions result in insufficient fuel heating which may also become a concern. The fluid flow system must provide sufficient fuel heating to prevent entrained water from freezing and possibly blocking small openings in the fuel system actuator servos. For example, at certain high power conditions such as cold day takeoff, the heat available from the circulating lubricating oil is often insufficient to heat the high volume of relatively cold fuel to a temperature above freezing. A servo heater is commonly provided to assure the high pressure flow which operates the actuators will not freeze. Further negative impact on engine efficiency, weight and expense thus results.

Accordingly, it is desirable to provide a fluid flow system for a gas turbine engine which significantly reduces heat generation at low flow demand to minimize the size and number of heat exchangers. It is further desirable to regulate actuator flow temperature at high fluid flows to preclude freezing of water entrained in the fuel.

SUMMARY OF THE INVENTION

The fluid flow system for a gas turbine engine according to the present invention provides combustion fuel to a main pump and an actuator pump. From the actuator pump, fuel is communicated through an actuator junction where high pressure fuel is supplied to an actuator minimum pressure valve (AMPV) and into a Thermal Bypass Valve (TBV.) The actuator junction includes a filter to further filter the high pressure fuel prior to entering an engine actuator. Engine actuators are high pressure fluid actuators which operate engine components such as inlet guide vanes, bleed valves, turbine cooling valves, nozzle actuators and the like.

The actuator pump is preferably sized to provide actuator steady state plus transient flow to assure positive operation of the actuators. The AMPV regulates actuator pump discharge pressure above actuator pump inlet pressure to the minimum pressure required to assure the positive operation of the actuators. That is, the AMPV assures that the actuator flow pressure provided by the actuator pump is that which is required to operate the actuator.

Fuel flow from the actuator pump in excess of the actuators needs is directed through the AMPV and into the TBV. Depending upon the temperature of the fuel, the TBV determines the path of the excess actuator pump fluid flow. The TBV divides the fuel flow between being recirculated to the actuator pump inlet and the main pump output flow path to the engine fuel input conduit. Preferably, when the fuel is near the freezing point of water, the TBV will recirculate the fuel to the actuator pump inlet to raise the fuel temperature within the actuator fuel flow circuit without the heretofore-required servo heater. The engine actuators are thereby assured of receiving flow which precludes freezing of water entrained in the fuel. When there is minimal concern with the possibility of freezing water entrained in the fuel, the TBV passes a greater percentage of fuel through to join together in the engine fuel input conduit. The AMPV assures that the actuator flow pressure is always that which is required to operate the actuators.

The present invention therefore provides a fluid flow system for a gas turbine engine which significantly reduces heat generation at low flow demand to minimize the demand for heat exchangers while regulating actuator flow temperature at high fluid flows to preclude freezing of water entrained in the fuel.

BRIEF DESCRIPTION OF THE DRAWINGS

The various features and advantages of this invention will become apparent to those skilled in the art from the following detailed description of the currently preferred embodiment. The drawing that accompanies the detailed description can be briefly described as follows.

DETAILED DESCRIPTION OF THE PREFERRED EMBODIMENT

Figure 1:
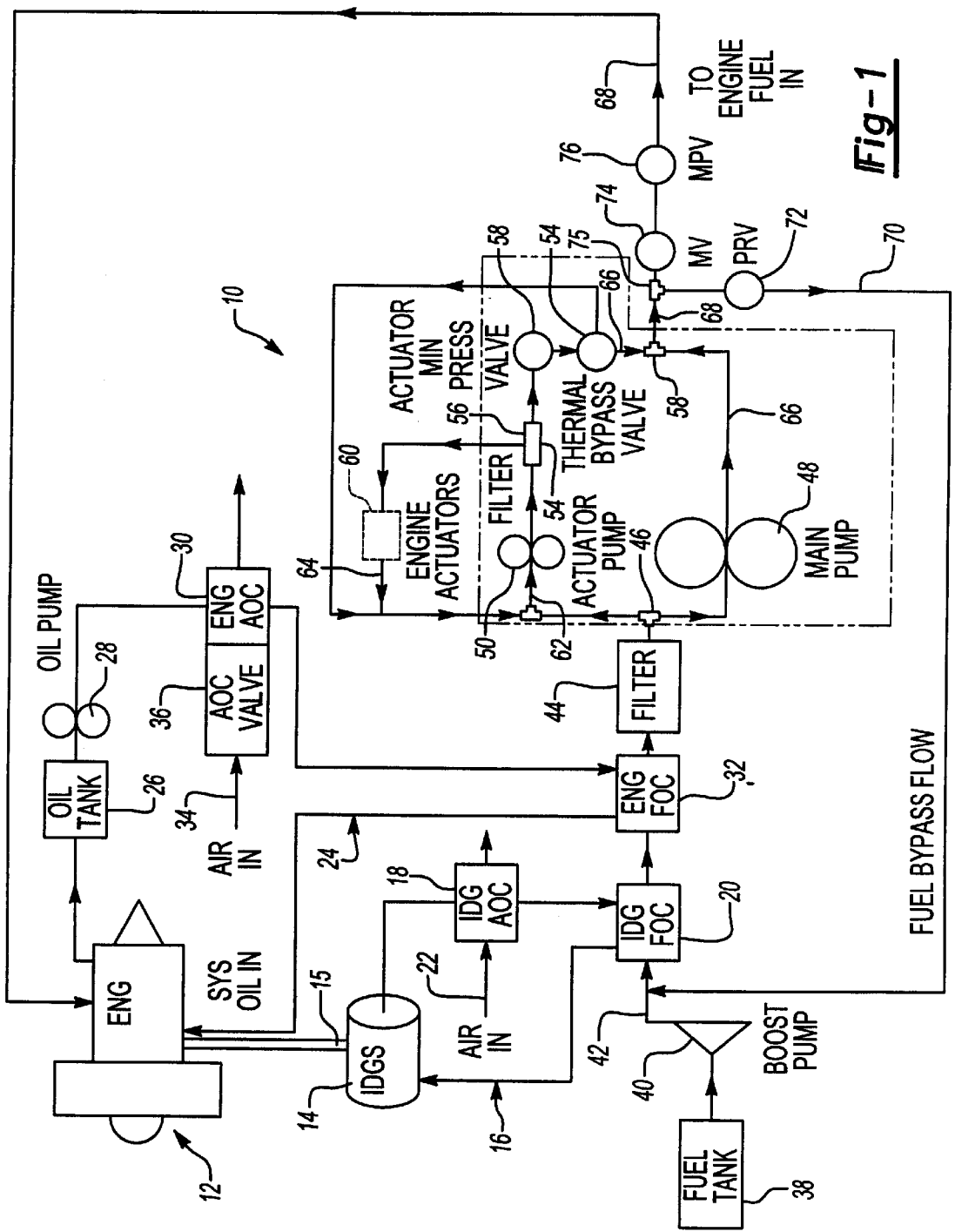
FIG. 1 is a schematic representation of a fuel and oil flow system according to the present invention.

FIG. 1 shows a schematic representation of a fluid flow system 10 for a gas turbine engine 12. It should be understood that although the illustrated embodiment will refer to aircraft systems, sea, air, land and other vehicles will benefit from the instant invention.

An Integrated Drive Generator System (IDGS) 14 is mechanically linked (illustrated schematically at 15) to the engine 12. The IDGS 14 is preferably a constant speed drive system which provides electrical power for the system 10 and other vehicle components. The IDGS 14 is cooled by an IDGS oil loop 16 wherein oil flowing from the IDGS 14 passes in sequence through a first IDG air-oil cooler 18 and a IDG fuel-oil cooler 20 before being returned to the IDGS 14. Cooling air (illustrated schematically by arrow 22) is extracted (bleed air) from the compressor or fan section of the engine 12 through the IDG air-oil cooler 18. It should be understood that other air sources such as a RAM air source will also benefit from the present invention. It should be further understood that the term "cooler" refers to a heat exchanger device which alters the thermal properties of the fluid mediums flowing there through.

Lubricating and cooling oil for the main engine bearings and other internal components of the engine 12 circulates in a second primary oil loop 24, passing in sequence from an oil storage tank 26, an oil pump 28, an engine air-oil cooler 30, and an engine fuel-oil cooler 32 before returning to the engine 12. Cooling air (illustrated schematically by arrow 34) for the engine air-oil cooler 30 is regulated by an air-oil cooler valve 36. The air-oil cooler valve 36 regulates the air into the air-oil cooler in a known manner.

Combustion fuel is supplied to the engine from the main fuel tank 38 by an engine driven boost pump 40. Boost pumps are typically centrifugal pumps designed to operate at an essentially constant pressure for a given engine speed, independent of the volumetric flow rate of fuel there through. Boost pump 40 supplies fuel to a fuel conduit 42 which communicates fuel through the aforementioned IDG fuel-oil cooler 20 and engine fuel-oil cooler 32. From the fuel-oil coolers 20,32 the fuel passes through a filter 44 and into a junction 46.

From the junction 46, combustion fuel is supplied to a main pump 48 and an actuator pump 50. The main pump is sized to provide engine burn flow. The pumps 48,50 thus both receive fuel under low pressure from the common source. From the main pump 48, fuel is communicated through a main pump junction 52 which communicates with a thermal bypass valve (TBV) 54. From the actuator pump 50, fuel is communicated through an actuator junction 56 where high pressure fuel is supplied through an actuator minimum pressure valve (AMPV) 58 and into the TBV 54.

The actuator junction 56 preferably includes a filter 57 to further filter the high pressure fuel supplied by the actuator pump 50 prior to entering an engine actuator (illustrated schematically at 60.) The actuators 60 are high pressure fluid actuators which operate engine components such as inlet guide vanes, bleed valves, turbine cooling valves, nozzle actuators and the like. The actuator pump 50 is preferably sized to provide actuator steady state plus transient flow to assure positive operation of the actuators 60. Most preferably, the actuator pump 50 provides fuel to the actuators 60 at a pressure (at least approximately 300 psi) which is significantly higher than the main pump 48 pressure (at least approximately 100 psi.)

The AMPV 58 regulates actuator pump 50 discharge pressure above an actuator pump inlet 62 pressure to the minimum pressure required to assure the positive operation of the actuators 60. That is, the AMPV 58 assures that the actuator flow pressure provided by the actuator pump 50 is always that which is required to operate the actuator 60. From the actuators 60 fuel is returned to the actuator pump inlet 62 through an actuator return conduit 64.

Fuel flow from the actuator pump 50 in excess of the actuators 60 needs is directed through the AMPV 58 and into the TBV 54. Depending upon the temperature of the fuel, the TBV determines the flow path of the excess fluid from the actuator pump 50. The TBV 54 selectively divides the fuel flow between being recirculated to the actuator pump inlet 62 and the main pump output flow path passing through main pump conduit 66 to join together in the engine fuel input conduit 68. Preferably, when the fuel is near the freezing point of water, the TBV 54 will recirculate the fuel to the actuator pump inlet 62 to raise the fuel temperature within the actuator fuel flow circuit without the heretofore-required servo heater. The engine actuators 60 are thereby assured of receiving flow which precludes freezing of water entrained in the fuel. When there is minimal concern with the possibility of freezing water entrained in the fuel, the TBV 54 passes a greater percentage of fuel to the main pump conduit 66 to join together in the engine fuel input conduit 68. The AMPV 58 assures that the actuator flow pressure is always that which is required to operate the actuators 60. It should be understood that the TBV 54 may operate at a fixed and/or varied temperature or range of temperatures depending on engine operating condition and environment and is not to be limited to actuation at only a single temperature.

A bypass flow conduit 70 recirculates excess fuel flow to the output of the boost pump 40. A Pressure Regulating Valve (PRV) 72 within the bypass flow conduit 70 senses a pressure drop across a metering valve (MV) 74. The MV 74 is preferably located in the engine fuel input conduit 68 after a junction 75 which provides for the bypass of excess main pump 48 and actuator pump 50 flow as required to maintain a constant metering valve (MV) 74 pressure drop.

The Minimum Pressure Valve (MPV) 76 maintains a minimum pressure rise between the main pump inlet and the main pump discharge. Typically, at reduced flow conditions, the pressure required to deliver burn flow to the engine 12 is significantly less that that required by the actuators 60. As the actuator pump 50 provides high pressure to the actuators 60, the main pump is sized to provide engine burn flow and maintain proper operation of the main pump 48. The pressure rise is preferably set to be that which assures proper main pump 48 operation. That is, the main pump 50 and MPV 76 are relieved from the heretofore limitation of providing high pressure fuel to the actuators.

The present invention properly schedules burn flow to the engine 12 while reducing the bypass flow through the bypass flow conduit 70. Less recirculation reduces the heating of the combustion fuel significantly reducing heat generation at low flow demand. The present invention thus reduces the necessity for the considerably heavy and cumbersome air/oil and fuel/oil coolers. The present invention thereby further benefits from lighter, smaller and/or less numerous coolers.

It should be understood that although the bypass flow in the illustrated embodiment is a single flow path, other and/or multiple bypass flow paths to other upstream locations will also benefit from the present invention. For example, an alternative or additional pressure relief valve could also divert bypass flow to the fuel conduit 42 between the fuel-oil coolers 20, 32.

Furthermore, while it is obvious it still is worth stating that the present invention is clearly not limited to a manual valve control. The system may additionally and or alternatively be implemented in a microprocessor based electronic actuation system (either digital or analog).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fluid flow system for a gas turbine engine comprising:

a main pump in fluid communication with a thermal bypass valve; and an actuator pump in fluid communication with said thermal bypass valve such that an excess actuator fluid flow from said actuator pump is directed to said thermal bypass valve said thermal bypass valve selectively directs at least a portion of the actuator fluid flow to an actuator pump inlet and a main fluid flow path from said main pump, said thermal bypass valve directs at least a portion of the actuator fluid flow to the main fluid flow path at temperatures above 32 degrees Fahrenheit.

2. The fluid flow system as recited in claim 1, further including an actuator minimum pressure valve which communicates with said actuator pump and said thermal bypass valve.

3. The fluid flow system as recited in claim 2, further including an actuator, said actuator minimum pressure valve directing at least a portion of an actuator fluid flow from said actuator pump to said actuator.

4. The fluid flow system as recited in claim 1, wherein said actuator pump operates at approximately 300 psi.

5. The fluid flow system as recited in claim 1, wherein said main pump operates at approximately 100 psi.

6. A fluid flow system for a gas turbine engine comprising:

a main pump in fluid communication with a thermal bypass valve;

an actuator pump in fluid communication with an engine actuator and said thermal bypass valve; and an actuator minimum pressure valve in fluid communication with said actuator pump and said thermal bypass valve, actuator fluid flow from said actuator pump in excess of said actuator requirements directed to said thermal bypass valve.

7. The fluid flow system as recited in claim 6, wherein flow from said actuator is directed to an actuator pump inlet.

8. The fluid flow system as recited in claim 6, wherein said thermal bypass valve selectively directs fluid flow to an actuator pump inlet and a main fluid flow path from said main pump.

9. The fluid flow system as recited in claim 6, further including a source to provide fluid flow to a main pump inlet and an actuator pump inlet.

10. The fluid flow system as recited in claim 9, further including a pressure regulating valve within a main flow path from said main pump to bypass excess actuator fluid flow and main pump fluid flow upstream of said main pump inlet and said actuator pump inlet.

11. The fluid flow system as recited in claim 10, further including a metering valve within said main flow path such that said pressure regulating valve is operable to sense a pressure drop across said metering valve.

12. The fluid flow system as recited in claim 6, wherein said engine actuator includes a turbine cooling valve.

13. The fluid flow system as recited in claim 6, wherein said engine actuator includes a engine nozzle actuator.

14. The fluid flow system as recited in claim 6, wherein said thermal bypass valve directs at least a portion of said actuator fluid flow to a main fluid flow path at temperatures above 32 degrees Fahrenheit.

15. A method of controlling a fluid flow system for a gas turbine engine comprising the steps of:

(1) dividing fluid flow from a source between a relatively high pressure source and a relatively low pressure source;

(2) communicating a low pressure output from the low pressure source and a high pressure output from the high pressure source with a thermally dependent device; and (3) selectively directing at least a portion of said high pressure output from the thermally dependent device between an input of the high pressure source and a main fluid flow path in communication with the low pressure output.

16. A method as recited in claim 15, wherein said step (2) includes communicating at least a portion of the high pressure output to an actuator operable by the flow of the high pressure output.

17. A method as recited in claim 16, wherein the portion of the high pressure output actuator is always predetermined pressure.

18. A method as recited in claim 15, wherein said step (3) is dependent upon assuring said high pressure output is maintained above a predetermined temperature.

* * * * *

UNITED STATES PATENT AND TRADEMARK OFFICE
CERTIFICATE OF CORRECTION

PATENT NO. : 6,651,441 B2
DATED : November 25, 2003
INVENTOR(S) : Reuter et al.

It is certified that error appears in the above-identified patent and that said Letters Patent is hereby corrected as shown below:

Column 6,
Line 48, please insert -- maintained above a -- after "always" and before "predetermined"

Signed and Sealed this

Twenty-third Day of March, 2004

JON W. DUDAS
*Acting Director of the United States Patent and Trademark Office*